United States Patent
Carlsen et al.

(10) Patent No.: US 8,326,086 B2
(45) Date of Patent: Dec. 4, 2012

(54) ELASTIC IMAGE REGISTRATION

(75) Inventors: Ingwer Carlsen, Hamburg (DE); Thomas Netsch, Hamburg (DE); Astrid Franz, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 834 days.

(21) Appl. No.: 10/596,321

(22) PCT Filed: Dec. 10, 2004

(86) PCT No.: PCT/IB2004/052746
§ 371 (c)(1),
(2), (4) Date: Jun. 9, 2006

(87) PCT Pub. No.: WO2005/059831
PCT Pub. Date: Jun. 30, 2005

(65) Prior Publication Data
US 2007/0179377 A1 Aug. 2, 2007

(30) Foreign Application Priority Data
Dec. 11, 2003 (EP) .................................... 03104644

(51) Int. Cl.
*G06K 9/32* (2006.01)
*G06K 9/00* (2006.01)
(52) U.S. Cl. .................... 382/294; 382/103; 382/128
(58) Field of Classification Search .................. 382/294
See application file for complete search history.

(56) References Cited

U.S. PATENT DOCUMENTS

| | | | | |
|---|---|---|---|---|
| 5,581,308 A * | 12/1996 | Lee | ............................ | 348/699 |
| 5,611,000 A * | 3/1997 | Szeliski et al. | .............. | 382/294 |
| 5,623,560 A * | 4/1997 | Nakajima et al. | ........... | 382/295 |
| 5,633,951 A * | 5/1997 | Moshfeghi | ................... | 382/154 |
| 5,715,166 A * | 2/1998 | Besl et al. | .................... | 700/182 |
| 5,802,220 A * | 9/1998 | Black et al. | .................. | 382/276 |
| 5,982,909 A * | 11/1999 | Erdem et al. | ................. | 382/103 |
| 6,226,418 B1 * | 5/2001 | Miller et al. | ................. | 382/294 |
| 6,434,278 B1 * | 8/2002 | Hashimoto | ................... | 382/285 |
| 6,438,253 B1 * | 8/2002 | Barbaresco et al. | ......... | 382/103 |
| 6,456,867 B2 * | 9/2002 | Reisfeld | ....................... | 600/407 |
| 6,563,941 B1 * | 5/2003 | O'Donnell et al. | .......... | 382/131 |
| 6,580,821 B1 * | 6/2003 | Roy | ............................. | 382/154 |
| 6,633,686 B1 * | 10/2003 | Bakircioglu et al. | ......... | 382/294 |
| 6,664,956 B1 * | 12/2003 | Erdem | ......................... | 345/419 |

(Continued)

FOREIGN PATENT DOCUMENTS
WO 9924932 A1 11/1998

OTHER PUBLICATIONS

Sinitsyn, "A Synchronization Framework for Personal Mobile Servers", Proceedings Fo the Second IEEE Annual Converence on Pervasive Computing and Communications Workshops, 2004, pp. 1-5.

(Continued)

*Primary Examiner* — David Zarka

(57) ABSTRACT

Image registration very often used to be a tedious task which had to be performed manually. According to an exemplary embodiment of the present invention, a non-rigid image registration by an iterative refinement process based on a combination of landmarks with similarity values is proposed. Advantageously, a very fast and robust method maybe provided.

10 Claims, 3 Drawing Sheets

U.S. PATENT DOCUMENTS

| | | | |
|---|---|---|---|
| 6,718,290 B1 * | 4/2004 | Szymczak et al. | 703/2 |
| 6,721,450 B2 * | 4/2004 | Tannenbaum et al. | 382/173 |
| 6,820,043 B2 * | 11/2004 | Mallet et al. | 703/2 |
| 2002/0054699 A1 * | 5/2002 | Roesch et al. | 382/131 |
| 2003/0048955 A1 * | 3/2003 | Pardas et al. | 382/243 |
| 2003/0128890 A1 * | 7/2003 | Roesch et al. | 382/276 |
| 2003/0140088 A1 | 7/2003 | Robinson et al. | |
| 2003/0190091 A1 | 10/2003 | Stewart et al. | |
| 2003/0206645 A1 * | 11/2003 | Okazaki et al. | 382/117 |
| 2006/0034500 A1 * | 2/2006 | Quist et al. | 382/130 |

OTHER PUBLICATIONS

Li et al, "3-D Inter-Subject Warping and Registration of Pulmonary CT Images for a Human Lung Model" Proceedings of the SPIE, vol. 4683, Feb. 26, 2002, pp. 324-335.

Rohr, "Spline-Based Elastic Image Registration" PAMM, Proc. Appl. Math. Mech Vol. 3, 2003, pp. 36-39.

Marsland et al, "Constructing Data-Driven Optimal Representations for Iterative Pairwise Non-Rigid Registration" LNCS 2717, 2003, pp. 50-60.

Ma et al, "Progressive Registration of Range Image Based on Surface Triangulation", Applications of Digital Image Processing XXIII, Proceedings of SPIE, Vol. 4115, 2000, pp. 79-90.

Rosch et al, 3D Respiratory Motion Compensation by Template Propagation, Medical Image Computing and Computer-Assisted Intervention, 2002, pp. 639-646.

Rosch et al, "Robust 3D Deformation Field Estimation by Template Propagation", Medical Image Computing and Computer-Assisted Intervention, 2000, pp. 521-530.

* cited by examiner

ELASTIC IMAGE REGISTRATION

The present invention relates to the field of digital imaging, for example, in the field of medical imaging. In particular, the present invention relates to a method of registering a first image (e.g. a floating image) and a second image (e.g. a reference image), an image processing device and to a computer program for registering a first image and a second image.

When two images of the same object have been taken from different projections or at different points of time, or during different moving stages of the object of interest, or when two images do not come from the same object, but from objects of the same class (for example, two faces or two brains), it may be highly desirable to establish correspondences. Two classes of deformations have to be compensated in order to establish these correspondences: rigid deformations resulting from translational and rotational movements of the object imaged and non-rigid deformations resulting from elastic deformations of the object imaged. An example of such an application is to match a brain with an anatomical atlas in order to automatically find abnormalities or to label the brain with anatomical names. Another example is to observe the deformation over the time of, for example, a beating heart or to register images of a deformable region of a patient (for example, abdomen) taken at different times. Another example is the combination of images acquired with different modalities such as Computer Tomography (CT), Magnetic Resonance Imaging (MRI), Ultra Sound (US), Positron Emission Tomography (PET), Single Photon Emission Computed Tomography (SPECT) to improve the diagnostic process through the combined analysis of anatomical and physiological information.

It is an object of the present invention to provide for an improved image registration.

According to an exemplary embodiment of the present invention as set forth in claim 1, the above object may be solved by a method of registering a first image and a second image, wherein at least one first landmark is selected in the first image and at least one second landmark is selected in the second image. Then, these first and second images are registered by using a similarity value, which relates to a similarity of a first region in the first image determined by at least one first landmark and a second region in the second image determined by at least second landmark. The first and second landmarks correspond to each other.

In other words, according to this exemplary embodiment of the present invention, landmarks, for example in medical applications anatomical landmarks, are automatically or manually selected in the images. These landmarks are used to define corresponding regions in the images. For example, in angiopraphic images relating to different heart phases, cross points of the LAD (left anterior descending) and the LCX (left circumflex) may be used as landmarks in the different phase images. Then, a similarity value is determined to express a similarity between the region indicated by the first landmark(s) in the first image and the region indicated by the second landmark(s) in the second image. This similarity value is used to register the images.

Corresponding landmarks in the first and second images are landmarks which, for example, for anatomical applications, mark the same or corresponding anatomical structures in the first or second images. I.e. corresponding landmarks in the first or second images are points or regions ideally to be registered on each other.

According to another exemplary embodiment of the present invention as set forth in claim 2, the first and second landmarks are selected in accordance with a qualifying function. This means that, for example, only the most significant landmarks, i.e. only the most significant corresponding features are selected as landmarks. In other words, this exemplary embodiment of the present invention focuses the computational work on few but significant landmarks, for example, in areas where needed due to large and highly non-linear deformations and/or well delineated anatomical structures allowing for unambiguous and precise registration. It should be noted that the landmarks may be selected interactively or automatically.

Advantageously, according to this exemplary embodiment of the present invention, the speed and robustness of the image registration may be improved by concentrating only on significant landmarks and image areas showing highly non-linear deformations.

According to another exemplary embodiment of the present invention as set forth in claim 3, a local deformation is determined for each landmark in the first and second images. These local deformations are expanded into a global deformation for the images. The global deformation may be used to perform the registration.

According to another exemplary embodiment of the present invention as set forth in claim 4, a similarity value is determined to describe a similarity between respective regions in the first and second images defined by the landmarks in the first and second images. This is done by using the global deformation fields. Advantageously, by this, a similarity of defined regions in the first and second regions may be determined and regions may be identified where the similarity is not yet sufficient.

According to another exemplary embodiment of the present invention as set forth in claim 5, for regions where the similarity is not yet sufficient, a new landmark is defined in the first and second image and the above described method may be iteratively repeated, i.e. for the new sub-regions defined by the new landmark, new sub-similarities with sub-similarity values are determined by using a local deformation field of this new landmark, which is expanded to a global deformation field for the image. Then, all the newly defined sub-regions are tested as to whether a respective similarity value meets with a pre-set threshold and if not, according to this exemplary embodiment of the present invention, new landmarks or new regions may be iteratively defined.

Due to the fact that the refinement process is always limited to the region with insufficient similarity and is not applied to the whole images, the computational efforts may be reduced. Furthermore, by either automatically or interactively performing this iterative refinement, it allows for a very accurate registration.

According to another exemplary embodiment of the present invention as set forth in claim 6, the method is iteratively repeated until all similarities of all regions and all sub-regions exceed a pre-set threshold value.

According to another exemplary embodiment of the present invention as set forth in claim 7, the method is applied in medical imaging on one of CT data sets, MRI data sets, PET data sets, SPECT data sets, and US data sets.

According to another exemplary embodiment of the present invention as set forth in claim 8, an image processing device is provided, allowing to perform a non-rigid image registration method by an iterative refinement process based on landmarks and a similarity value such as a gray value based measurement of a region in the images.

Advantageously, the image processing device according to this exemplary embodiment of the present invention has an improved registration speed and provides for a very accurate and robust registration of the first and second images.

According to another exemplary embodiment of the present invention as set forth in claim 9, a computer program is provided for registering a first image and a second image. The computer program may be written in any suitable programming language, such as C++ and may be stored on a computer readable device, such as a CD-ROM. However, the computer program according to the present invention may also be presented over a network such as the World Wide Web, from which it may be downloaded, for example, into the internal working memory of a processor.

It may be seen as the gist of an exemplary embodiment of the present invention that a non-rigid image registration is performed by an iterative refinement process based on landmarks combining local template matching. An example for a local template matching is described, for example, in P. Rösch et al, "3D respiratory motion compensation by template propagation" in T. Dohi and R. Kikinis, editors, "Proceedings of the 5$^{th}$ international conference on medical image computing and computer-assisted intervention"—MICCAI 2002, pages 639-646, Springer, 2002, which is hereby incorporated by reference.

The image similarity in the respective regions may, for example, be determined in accordance with J. V. Hajnal et al, editors, "Medical image registration", CRC Press, 2001, which is hereby incorporated by reference. The method focuses the computational work on few but significant landmarks and automatically refines the deformation field only in areas where needed due to large and highly non-linear deformations and/or well delineated anatomical structures allowing for unambiguous and precise registration. When A denotes an image that has to be registered with a reference image B, starting from a few but significant landmarks, image A is tiled with simplices $P_A$ spanned by d+1 (d=dimensionality of the data set) neighboring landmarks. A global deformation field D is constructed by locating the landmarks in B based on local (for instance affine) deformations in their neighborhoods. Every simplex (region defined by the landmarks) $P_A$ is transformed into a simplex $P_B = D(P_A)$ and the similarity of, for example, the gray values of image A lying in $P_A$ and the gray values of image B lying in $P_B$ is estimated using, for example, mutual information or cross-correlation. If $P_A$ and $P_B$ are not sufficiently similar, a new landmark is located in $P_A$ and $P_A$ is divided into a plurality of d+1 smaller simplices. Advantageously, due to this, the tiling is iteratively refined until a desired similarity is achieved, resulting in a tiling grid that automatically adapts itself to local non-linearities and, for example, to anatomical structures.

These and other aspects of the present invention will become apparent from and elucidated with reference to the embodiments described hereinafter.

Exemplary embodiments of the present invention will be described in the following, with reference to the following drawings.

Figure 1:
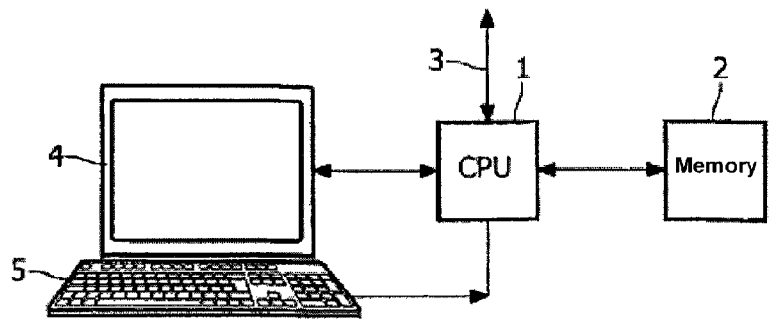
FIG. 1 shows a schematic representation of an image processing device according to an exemplary embodiment of the present invention, adapted to execute a method according to an exemplary embodiment of the present invention.

FIG. 1 depicts an exemplary embodiment of an image processing device according to the present invention, for executing an exemplary embodiment of a method in accordance with the present invention. The image processing device depicted in FIG. 1 comprises a central processing unit (CPU) or image processor 1, connected to a memory 2 for storing images or similarity values used or generated during the method. The image processor 1 may be connected to a plurality of input/output, network or diagnosis devices, such as an MR device or a CT device. Furthermore, the image processor 1 may be connected to an ultrasonic scanner. The image processor is furthermore connected to a display device 4 (for example, a computer monitor) for displaying information or images computed or adapted in the image processor 1. An operator may interact with the image processor 1 via a keyboard 5 and/or other input/output devices, which are not depicted in FIG. 1.

Figure 2:
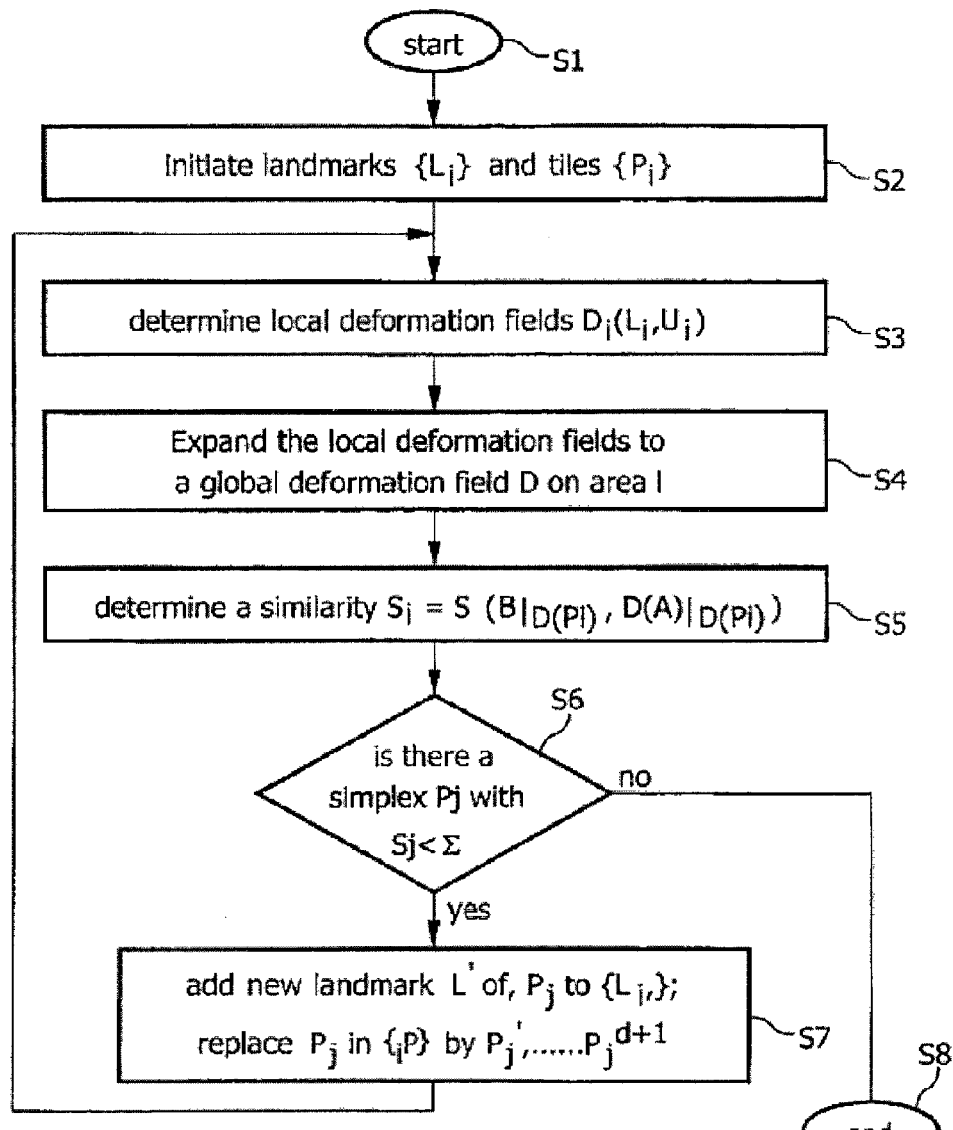
FIG. 2 shows a simplified flow-chart of an exemplary embodiment of a method according to the present invention, which may be performed in the image processing device depicted in FIG. 1.

FIG. 2 shows a flow-chart of an exemplary embodiment of a method for registering a first image and a second image.

In the following, the present invention will be described with reference to medical imaging, where the landmarks relate to anatomical features in the images and/or to areas having large and highly non-linear deformations and/or well-delineated anatomical structures allowing for an unambiguous and precise registration. However, it should be noted that the present invention may also be applied to non-medical applications, for example, in material testing or quality control, where images of actual products are compared to reference images. Also, this technique may be used for image recognition systems, for example, where faces filmed are to be matched with pre-registered faces to identify the faces or persons.

In short, the method according to this exemplary embodiment of the present invention, described in the following with reference to FIG. 2 relates to a non-rigid image registration by an iterative refinement process based on anatomical landmarks combining local template matching and gray value based measurement of image similarity. Let image A denote a floating image which has to be registered with a reference image B. Starting from few but significant landmarks (selected interactively or automatically), image A is tiled with simplices $P_A$ spent by d+1 (d=dimensionality of the data set) neighboring landmarks. A global deformation field D is constructed by locating the landmarks in image B based on local (for instance affine) deformations in their neighborhoods. Every simplex $P_A$ is transformed into simplex $P_B = D(P_A)$ and the similarity of the gray values of image A lying in $P_A$ and the gray values of image B lying in $P_B$ is estimated using, for example, mutual information or cross-correlation. If $P_A$ and $P_B$ are not sufficiently similar, a new landmark is located in $P_A$, and $P_A$ is divided into d+1 smaller simplices. In this way, the tiling is iteratively refined until a desired similarity is achieved, resulting in a tiling grid that automatically adapts itself to local non-linearities and anatomical structures. The iteration may be stopped when the similarity measure is sufficiently good in all simplices or when a maximum number of refinement steps are reached. The resulting global deformation field is then used to register the given images. The method is open to adjust the qualifying function for selecting the landmarks, the local similarity measure for matching the landmark-centered templates, the global similarity measure for estimating the similarity of the simplices, and the type of transformation used for modeling the non-linear deformations to the modalities, anatomical domains and contrast mechanisms involved. This will be described in further detail with reference to FIG. 2.

Figure 3:
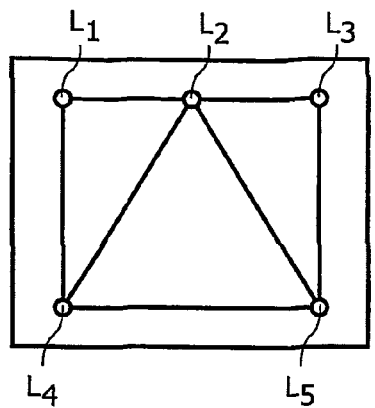
FIGS. 3 to 6 show simplified sketches of images and indicated operations performed on the images according to an exemplary embodiment of the method according to the present invention.

In FIG. 2, after the start in step S1, where, for example, the images to be registered are acquired, in step S2 a set (a plurality) of significant landmarks $\{L_i\}$ is selected in both images A and B, which can be unambiguously assigned or allotted to each other, i.e. which unambiguously correspond to each other. A significance of the landmarks may be hereby determined by means of a pre-determined qualifying function. With these landmarks $L_i$, a simplex tiling $\{P_i\}$ of the images is determined. For a two-dimensional image, the simplices are triangles, and for a three-dimensional image, the simplices are tetrahedrons. This is shown in further detail in FIG. 3, depicting image A or image B, where five landmarks $L_1$ to $L_5$ have been selected. As may be taken from FIG. 3, the landmarks are connected to each other by a line, such that simplices (here triangles) are formed, which tile the image region. This may also be referred to as simplex tiling.

As indicated above, the selection of the landmarks $L_i$ may be performed automatically or interactively by an operator. For performing such landmark selection automatically, the above qualifying function may be applied, for example, detecting the brightest spots in the images or a certain gradient in the image.

Then, in the subsequent step S3, local deformation fields $D_i$ ($L_i$, $U_i$) are determined for each landmark $L_i$. In other words, surrounding each landmark $L_i$, a local deformation field $D_i$ ($L_i$, $U_i$) is determined in the vicinity or region $U_i$ surrounding the respective landmark $L_i$.

Form, size and/or dimensions of the region $U_i$ is set such that there is sufficient structure, i.e. sufficient image energy in the region $U_i$ allowing to unambiguously determine the local deformation. Furthermore, size, form and/or dimension of $U_i$ is selected such that the local deformation may be sufficiently approximated by an affine transformation.

Figure 4:
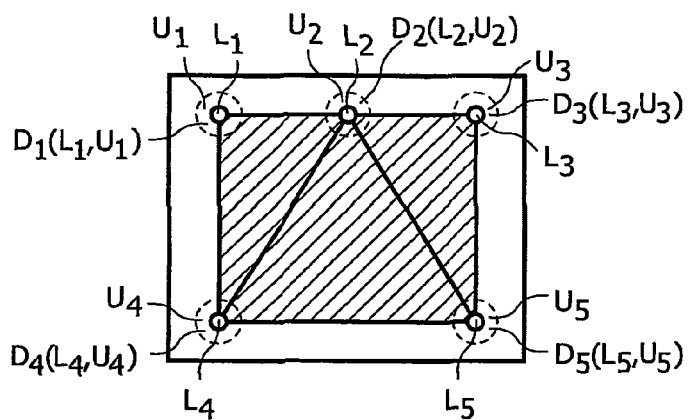

This is shown in further detail in FIG. 4, showing regions $U_1$ to $U_5$ surrounding the respective landmarks $L_1$ to $L_5$. As may be taken from FIG. 4, the shape of the regions $U_1$ to $U_5$ is circular. However, it should be noted that also other shapes, such as rectangles may be applied. Within these regions $U_1$ to $U_5$, the respective local deformation fields $D_1$ ($L_1$, $U_1$) to $D_5$ ($L_5$, $U_5$) are determined.

In the subsequent step S4, the local deformation fields $D_i$ ($L_i$, $U_i$) are expanded to a global deformation field on area I. In other words, the local deformation fields $D_i$ ($L_i$, $U_i$) are extended to a global deformation D onto the whole image area I in image A.

According to an exemplary embodiment, by varying the way the local deformation fields $D_i$ ($L_i$, $U_i$) are expanded to a global deformation field D, the method may be adapted to the respective application. For example, Gauss functions, polynomial functions, elastic functions or splines may be used to perform such expansion.

In the subsequent step S5, a similarity $S_i = S(B|_{D(P_i)}, D(A)|_{D(P_i)})$ is determined. In other words, in each tile, region or part $P_i$ of the tiling, a similarity $S_i$ for expressing a similarity between the reference image $B|_{D(P_i)}$ and the transformed floating image $D(A)|_{D(P_i)}$ or between the transformed reference image and the floating image. Advantageously, the similarity value is selected such that it increases with an increasing conformity between the images and is monotonic to a maximum value. Then, in the subsequent step S6 it is determined whether there is a simplex $P_j$ with $S_j \leq \Sigma$.

A pre-selected value $\Sigma$ of the similarity value S determines in which parts of the tiling $\{P_i\}$ i.e. in which simplex, the conformity between the reference image B and the transformed floating image A is not yet sufficient. In case it is determined in step S6 that there is a simplex $P_j$ with $S(P_j) < \Sigma$, then, the method continues to step S7, where a refinement is performed. Otherwise, the method continues to step S8, where it ends.

In step S7, in the simplex $P_j$ with $S(P_j) < \Sigma$, i.e. in the simplex to be refined, a new landmark is selected. According to an exemplary embodiment of the present invention, shown in FIG. 5, the new landmark $L_6$ is selected in accordance with the qualifying function such that it is the most significant landmark L' in the simplex $P_j$. This landmark is added to the set of landmarks $\{L_i\} = \{L_i\} \cup L_6$. With the new landmark $L_6$, the simplex $P_j$ is tiled. Here, $L_6$ is connected to each vertex (landmarks $L_2$, $L_4$, $L_5$) by a straight line. By this, for a two-dimensional image, three new triangles are generated and for a three-dimensional image, four new tetrahedrons are generated. In general: (d+1) new simplices are generated for d special dimensions. In the set of simplices $\{P_i\}$, the simplex $P_j$ is replaced by the (d+1) new simplices. Then, with the new set of landmarks $\{L_i\}$ and set of simplices $\{P_i\}$ the iteration returns to step S3, wherein, for the pre-existing landmarks and the pre-existing regions $U_i$, the local deformations $D_i$ are maintained. The method iteratively continues until there is no simplex left with $S_j < \Sigma$.

Figure 5:
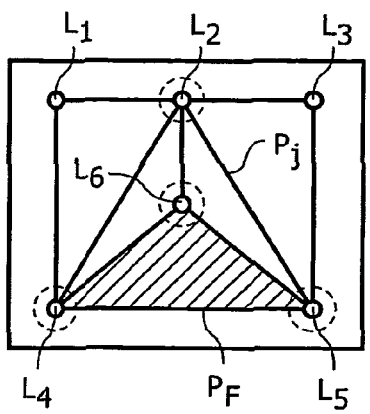
Figure 6:
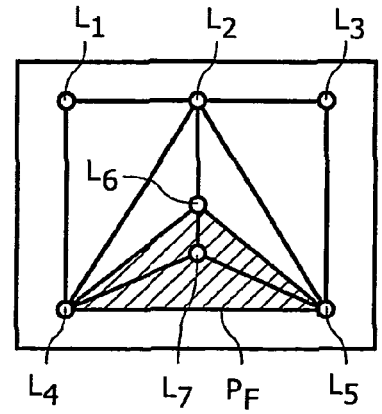

FIGS. 5 and 6 depict the further processing according to the method according to the present invention, as described by steps S3 to S7. In FIG. 5, the simplex $P_j$ with $S_j < \Sigma$ is hatched. For this hatched simplex $P_j$, defined by landmarks $L_2$, $L_4$ and $L_5$, where the similarity value is less than a threshold value, a new landmark $L_6$ is selected. Preferably, as indicated above, the landmark $L_6$ is a significant or the most significant landmark in the region $P_j$. Then, by connecting $L_6$ to the landmarks $L_2$, $L_4$ and $L_5$ of $P_j$, three new simplices are generated. Then, a local deformation field $D_6$ ($L_6$, $U_6$) is determined and the local deformation fields are expanded to a global deformation field. Then, similarity values are determined for each of these three new triangles. In case there is a triangle (here in FIG. 5 the triangle $P_F$), which similarity value is less than the pre-set threshold value, i.e. $S_F < \Sigma$, a new landmark $L_7$ is selected in the triangle $P_F$ as shown in FIG. 6. The method iteratively continues until the similarity value for each triangle exceeds or equals the threshold value.

Figure 7:
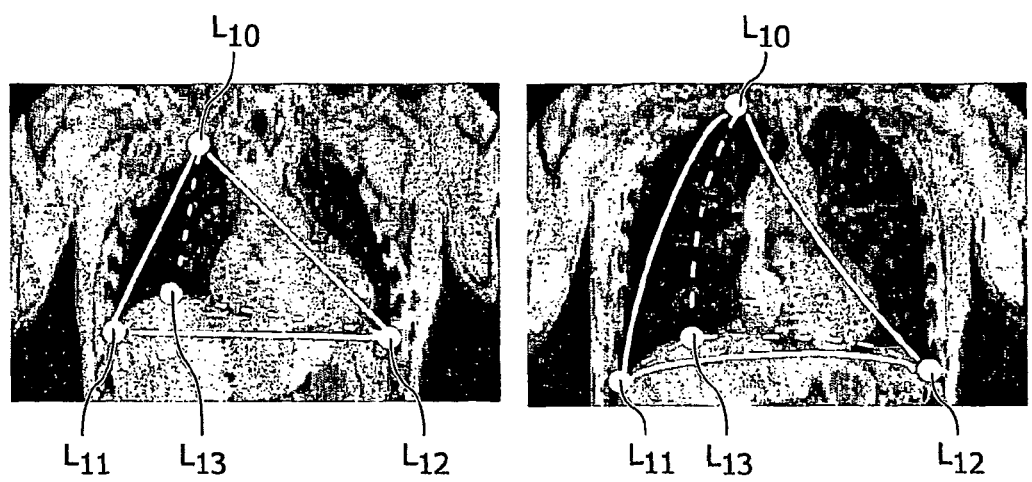
FIG. 7 shows two images as examples of a global elastic registration during a respiratory motion of the respiratory system performed in accordance with the exemplary embodiment of the method according to the present invention.

An application example of the above method is depicted in FIG. 7. In FIG. 7, two MR images of the respiratory system are shown in an exhaled (A) (left image of FIG. 7); and in an inhaled state (B) (right image of FIG. 7). A registration by using the landmarks $L_{10}$, $L_{11}$ and $L_{12}$ does not allow a sufficiently accurate registration of the two images since the movement of the diaphragm cannot be sufficiently reconstructed. Due to that, iteratively, the new significant landmark $L_{13}$ has been added.

Advantageously, the above method allows for a very accurate and reliable elastic registration of single or multi-modality image data sets. It may allow to improve speed and robustness of image registration by concentrating on significant landmarks and image areas showing highly non-linear deformations. Furthermore, it may allow the significant ranking and matching of landmarks, the local and global quality of registration and the type of non-linear transformations to be independently optimized with respect to the modalities, anatomical areas and expected deformations or application areas. It may allow to register very different imaging modalities by incorporating into these significance and quality measures a priori knowledge about the anatomy. Due to the focus on few but significant landmarks in conjunction with its automatic and spatial adaptivity to non-linear deformations, the above described invention may be very fast and well suited for real time registration, for example, during interventional procedures. In medical applications, global elastic registration may be required for a variety of clinical applications, where images acquired at different times, with different modalities or different patients have to be aligned. Important examples of, for example, tumor diagnostics and surgery, where images of different modalities show different aspects of the tumor, a comparison of pre- and post-intervention images, analysis of time series of medical images, matching of individual images with anatomical atlases derived from cohort studies etc. However, it should be noted that the above described invention may also be applied to any two or three-dimensional data sets.

The invention claimed is:

1. A method of registering a floating image and a reference image, the method comprising the steps of:
    selecting, by an image processing device, at least one first landmark in the floating image;
    selecting, by the image processing device, at least one second landmark in the reference image, wherein the at least one first landmark corresponds to the at least one second landmark; and
    registering, by the image processing device, the floating and reference images by using a similarity value which relates to a similarity of a first region in the floating image determined by the at least one first landmark and a second region in the reference image determined by the at least one second landmark, the registering including selecting at least one further first landmark in the floating image and at least one further second landmark in the reference image if the similarity value is less than a pre-selected value.

2. The method of claim 1, wherein the method is applied in medical imaging to one of CT data sets, MRI data sets, PET data sets, SPECT data sets, and ultrasonic imaging data sets.

3. The method of claim 1, wherein the selecting the at least one further first landmark in the floating image and the at least one further second landmark in the reference image is based on the similarity value not exceeding the pre-selected value.

4. Image processing device, comprising:
    a memory for storing a floating image and a reference image; and
    an image processor for registering the floating image and the reference mage,
    wherein the image processor is adapted to perform the following operation:
        selecting at least one first landmark in the floating image;
        selecting at least one second landmark in the reference image, wherein the art least one first landmark corresponds to the at least one second landmark; and
        registering the floating and reference images by using a similarity value which relates to a similarity of a first region in the floating image determined by the at least one first landmark and a second region in the reference image determined by the at least one second landmark, the registering including selecting at least one further first landmark in the floating image and at least one further second landmark in the reference image if the similarity value is less than a pre-selected value.

5. Computer program on a computer-readable device for registering a floating image and a reference image, wherein the computer program causes a processor to perform the following operation when the computer program is executed on the processor:
    selecting at least one first landmark in the floating image;
    selecting at least one second landmark in the reference image, wherein the at least one first landmark corresponds to the at least one second landmark; and
    registering the floating and reference images by using a similarity value which relates to a similarity of a first region in the floating image determined by the at least one first landmark and a second region in the reference image determined by the at least one second landmark, the registering including selecting at least one further first landmark in the floating image and at least one further second landmark in the reference image if the similarity value is less than a pre-selected value.

6. A method of registering a floating image and a reference image, the method comprising the steps of:
    selecting, by an image processing device, at least one first landmark in the floating image;
    selecting, by the image processing device, at least one second landmark in the reference image, wherein the at least one first landmark corresponds to the at least one second landmark; and
    registering, by the image processing device, the floating and reference images by using a similarity value which relates to a similarity of a first region in the floating image determined by the at least one first landmark and a second region in the reference image determined by the at least one second landmark, the registering including selecting at least one further first landmark in the floating image and at least one further second landmark in the reference image as a function of a pre-selected value of the similarity value,
    wherein, for the floating image having a first number of dimensions, a second number of first landmarks is selected; wherein, for the reference image having the first number of dimensions, a third number of second landmarks is selected; wherein the second number of first landmarks determine first vertices of first simplices for determining a fourth number of regions in the floating image; wherein the third number of second landmarks determine second vertices of second simplices for determining the fourth number of regions in the reference image; wherein the second number is the first number plus one wherein the first and second landmarks are selected in accordance with a qualifying function; and wherein the third number is equal to the second number.

7. The method of claim 6, wherein, for each of the second number of second landmarks, the local deformation field is determined for determining a first global deformation field which approximately describes a deformation required to the floating image for registration onto the reference image.

8. The method of claim 7, wherein, for each of the fourth number of regions in the floating image, a first similarity value is determined relating to a similarity between a respective one of the regions in the floating image to a respective corresponding one of the regions in the reference image by using the first global deformation field.

9. The method of claim 8, wherein it is determined whether there is a fifth region of the regions in the floating image in which the first similarity value is less than a preset threshold value; wherein, when there is a fifth region, a third landmark is selected in the fifth region for determining third simplices in the fifth region which determine a plurality of sixth regions;

wherein, when there is a fifth region, a fourth landmark is selected in a seventh region of the regions in the reference image for determining fourth simplices in the seventh region which determine a plurality of eighth regions; wherein the third landmark corresponds to the fourth landmark such that the sixth regions correspond to the eighth regions; wherein, for each of the sixth regions, a second similarity value is determined relating to a similarity between a respective one of the sixth regions to a respective one of the eighth regions by using a second global deformation field which has been refined by using a further local deformation field of the third landmark.

10. The method of claim 9, wherein the method is iteratively repeated until all similarities exceed the preset threshold value.

* * * * *